US012800101B2

(12) United States Patent
Chavan Patil et al.

(10) Patent No.: US 12,800,101 B2
(45) Date of Patent: Nov. 17, 2026

(54) STEAM TRAP SYSTEM

(71) Applicant: Forbes Marshall Technology Pvt Ltd, Maharashtra (IN)

(72) Inventors: Pranil Chavan Patil, Maharashtra (IN); Manoj Gautham, Maharashtra (IN)

(73) Assignee: FORBES MARSHALL TECHNOLOGY PVT LTD, Maharashtra (IN)

(*) Notice: Subject to any disclaimer, the term of this patent is extended or adjusted under 35 U.S.C. 154(b) by 0 days.

(21) Appl. No.: 19/111,096

(22) PCT Filed: Sep. 13, 2023

(86) PCT No.: PCT/IB2023/059073
§ 371 (c)(1),
(2) Date: Mar. 12, 2025

(87) PCT Pub. No.: WO2024/057220
PCT Pub. Date: Mar. 21, 2024

(65) Prior Publication Data

US 2026/0085788 A1 Mar. 26, 2026

(30) Foreign Application Priority Data

Sep. 13, 2022 (IN) ............................ 202221052224

(51) Int. Cl.
*F16T 1/20* (2006.01)
*F16T 1/48* (2006.01)

(52) U.S. Cl.
CPC . *F16T 1/20* (2013.01); *F16T 1/48* (2013.01)

(58) Field of Classification Search
CPC ..................................... F16T 1/20; F16T 1/48
See application file for complete search history.

(56) References Cited

U.S. PATENT DOCUMENTS 5,687,755 A * 11/1997 Farquhar .................. F16T 1/38 137/182
5,983,919 A * 11/1999 Ottinger .................... F16T 1/20 137/430

(Continued)

FOREIGN PATENT DOCUMENTS

CN 206290962 U 6/2017
JP 2020112240 A 7/2020

OTHER PUBLICATIONS

International Search Report and Written Opinion issued on Jan. 17, 2024, in International Application No. PCT/IB2023/059073.

*Primary Examiner* — Patrick C Williams
(74) *Attorney, Agent, or Firm* — Panitch Schwarze Belisario & Nadel LLP

(57) ABSTRACT

The present disclosure relates to a steam trap system, including: an inlet port to receive steam; a diversion valve, configured to be mounted on the inlet port and is further configured to be branched to a first passage and a second passage; a bypass outlet, configured to be in communication with the first passage; a trap mechanism, configured to be in communication with the second passage; at least one first sensing unit, configured to generate at least one first sensed signal corresponding to the steam flow characteristics; a control unit, configured to be connection with the first sensing unit to generate an actuating signal; and a valve actuator, configured to be in communication with the control unit to selectively activate either the bypass outlet port or the trap mechanism, to allow separation of the condensate from the steam. Advantageously, the system efficiently removes the condensate from the steam.

11 Claims, 3 Drawing Sheets

(56) References Cited

U.S. PATENT DOCUMENTS

Figure 1:
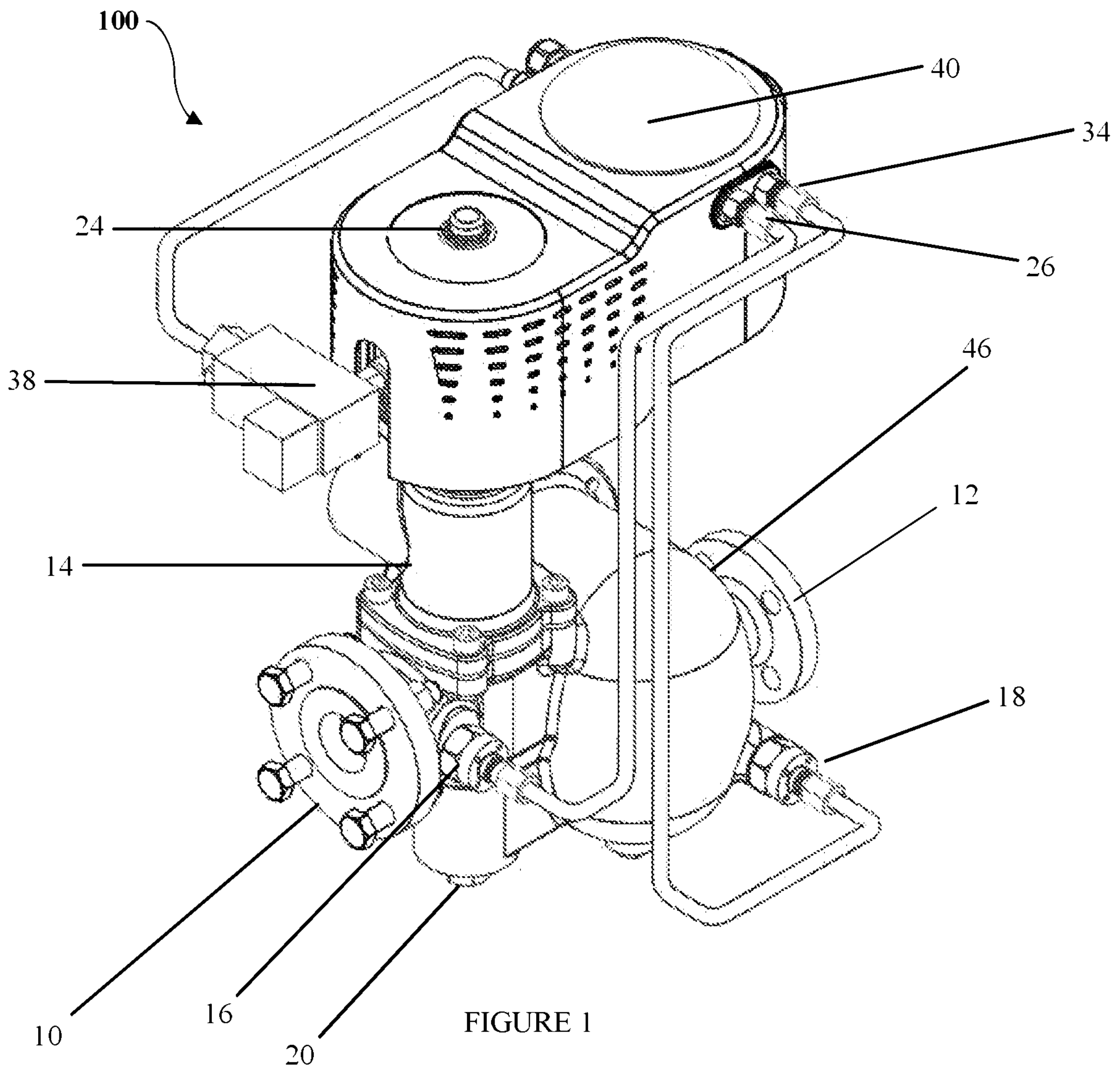

| | | | | |
|---|---|---|---|---|
| 6,035,882 | A * | 3/2000 | Brint | F16T 1/48<br>236/94 |
| 6,196,253 | B1 * | 3/2001 | Love | F16K 13/10<br>137/204 |
| 6,279,593 | B1 * | 8/2001 | Sheppard | F16T 1/00<br>137/181 |

* cited by examiner

STEAM TRAP SYSTEM

CROSS-REFERENCE TO RELATED APPLICATIONS

This application is a Section 371 of International Application No. PCT/IB2023/059073, filed Sep. 13, 2023, which was published in the English language on Mar. 21, 2024, under International Publication No. WO 2024/057220 A1, which claims priority under 35 U.S.C. § 119(b) to Indian Application No. 202221052224, filed Sep. 13, 2022, the disclosures of all of which are incorporated herein by reference in their entireties.

FIELD

The present disclosure relates to the field of steam trap system.

BACKGROUND

The background information herein below relates to the present disclosure but is not necessarily prior art.

Steam traps system are automatic valves that release condensed steam (condensate) from a steam space while preventing the loss of live steam, while simultaneously releasing air and non-condensable gases from the steam space. Hot water is removed by the trap from the steam side, of the steam trap, as condensate and the same is either returned to the boiler via condensate return lines or discharged to the atmosphere.

Steam traps are broadly classified on the basis of their generic operations i.e. "continuous flow" and "intermittent flow". Continuous flow type traps are typically configured with float traps that removes the condensate which is in liquid phase and holds back the steam which is in vapour phase. However, the conventional steam trap system removes condensate irrespective of its quality as they do not have any mechanism to identify and segregate impure condensate or any other fluid apart from the condensate. As a result, the impure condensate from the trap gets discharged into a common condensate recovery system, and contaminates the condensate collected from other traps. Therefore, it becomes necessary to drain the impure condensate before it reaches the recovery system to avoid damages to the condensate recovery system and the condensate utilization system. However, draining the hot impure condensate in large quantities is a huge loss in terms of water collection cost, water treatment cost, and heating cost, thus being not environment-friendly. Also, in case of a failure at closed condition, the conventional steam trap fails to detect the failure and take any corrective action on such failures.

There is therefore felt a need for a steam trap system that alleviates the aforementioned drawbacks.

OBJECT

Some of the objects of the present disclosure, which at least one embodiment herein satisfies, are as follows:

An object of the present disclosure is to provide a steam trap system which is configured to efficiently separate condensate from a steam space.

Another object of the present disclosure is to provide a steam trap system which detect and divert condensate with dissolved impurities or other fluids other than condensate to ensure recovery of uncontaminated condensate therethrough.

Still another object of the present disclosure is to provide a steam trap system which can be monitored locally as well as remotely.

Yet another object of the present disclosure is to provide a steam trap system which facilitates setting of thresholds remotely through any wired or wireless device using digital connectivity technology.

Still another object of the present disclosure is to provide a steam trap system which communicate and share data with other devices through wired and wireless communication protocols.

Yet another object of the present disclosure is to provide a steam trap system capable of communicating and sharing data to cloud.

Still another object of the present disclosure is to provide a steam trap system which removes condensate fluid through a bypass even when there is a failure of steam trap in closed condition to prevent waterlogging in steam space of process equipment.

Yet another object of present disclosure is to provide a steam trap system which work in flammable and non-flammable industrial environment.

Still another object of the present disclosure is to provide a steam trap system to detect the quality of condensate and divert the impure condensate or fluid other than condensate through bypass valve.

Yet another object of the present disclosure is to provide a steam trap system which monitors failure mode and working mode.

Still another object of the present disclosure is to provide a steam trap system which indicates various working and failure conditions thereof.

Yet another object of the present disclosure is to provide a steam trap system which indicates heat exchanger leakage with the detection of contaminated condensate. Still another object of the present disclosure is to provide a steam trap system which helps in monitoring of heating cycle duration and helps in improving the process efficiency. Yet another object of the present disclosure is to provide a steam trap system which helps in saving water cost, water treatment cost, and heating cost.

Still another object of the present disclosure is to provide a steam trap system which is environment friendly.

Other objects and advantages of the present disclosure will be more apparent from the following description, which is not intended to limit the scope of the present disclosure.

SUMMARY

The present disclosure envisages a steam trap system. The system is configured to separate condensate fluid from steam. The system comprises: an inlet port, configured to receive steam flow therein, the steam has condensate fluid with or without dissolved impurities; a diversion valve, configured to be mounted on a downstream of the inlet port and is further configured to be branched to at least a first passage and a second passage; a bypass outlet, configured to be in communication with the first passage of the diversion valve and is further configured to allow passage for the condensate fluid having dissolved impurities in an operative configuration of the system; a trap mechanism, configured to be in communication with the second passage of the diversion valve and is further configured to allow passage for the condensate fluid free of impurities in an operative configuration of the system; at least one first sensing unit, configured within the inlet port and is further configured to generate at least one first sensed value corresponding to the steam flow characteristics; a control unit, configured to store threshold values of at least one steam flow characteristics, the control unit is configured to be connection with the first sensing unit to receive the at least one first sensed value and is further configured to generate an actuating signal based on comparison of the first sensed value with the stored threshold values; and a valve actuator, configured to be in communication with the control unit and the diversion valve, the valve actuator is configured to receive the actuating signal from the control unit and is further configured to selectively activate either the bypass outlet or the trap mechanism of the diversion valve to allow separation of the condensate fluid with or without dissolved impurities from the steam, in an operative configuration of the system.

In an embodiment, the steam flow characteristics include conductivity and the temperature of the condensate fluid of the steam.

In an embodiment, the first sensing unit is configured to generate a first sensed conductivity value and a first sensed temperature value of the steam entering through the inlet port.

In an embodiment, the valve actuator is configured to be in communication with the control unit by means of a solenoid valve. The solenoid valve is configured to receive the actuating signal from the control unit and is further configured to convert the actuating signal to a pneumatic signal to actuate the valve actuator.

In an embodiment, the valve actuator is selected from a group of pneumatic actuators and is configured to operate the diversion valve based on the pneumatic signal to direct the flow of condensate fluid to pass through either the bypass outlet or the trap mechanism.

In an embodiment, the valve actuator is configured to activate the bypass outlet of the diversion valve if the first sensed conductivity value is greater than the threshold conductivity value to enable the condensate fluid having dissolved impurities to drain out.

In another embodiment, the valve actuator is configured to activate the trap mechanism of the diversion valve if the first sensed conductivity value is less than the threshold conductivity value to enable the condensate fluid free of impurities to drain out from a trap outlet.

In an embodiment, the system includes at least one second sensing unit. The second sensing unit is configured to be mounted within the vicinity of the trap mechanism and is further configured to generate a second sensed conductivity value and a second sensed temperature value of the steam exiting through the trap mechanism.

In an embodiment, the first sensing unit and the second sensing unit are configured to measure the real-time steam flow characteristics of the condensate fluid entering through the inlet port and exiting through the trap mechanism, respectively.

BRIEF DESCRIPTION OF ACCOMPANYING DRAWING

Figure 2:
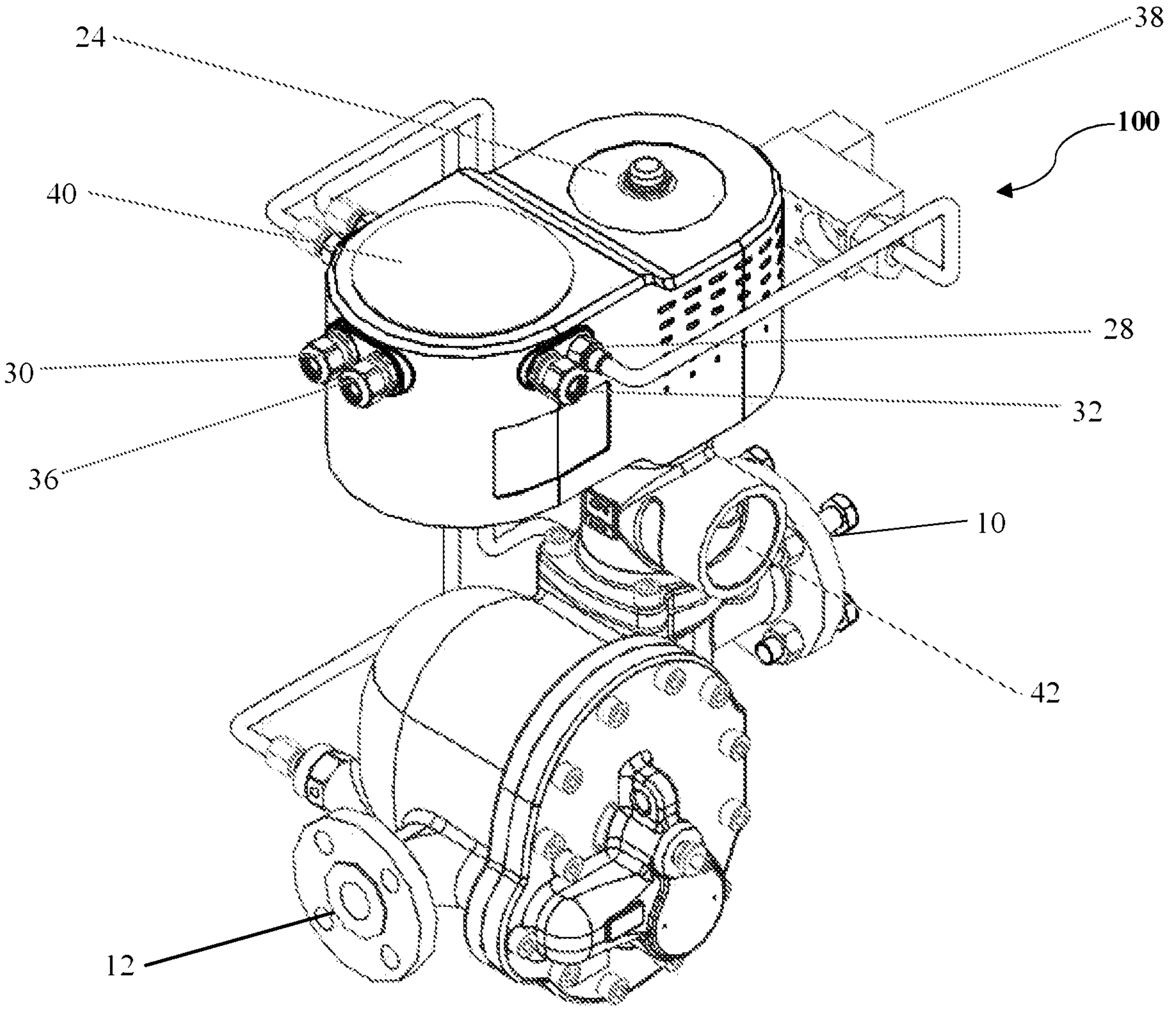
Figure 3:
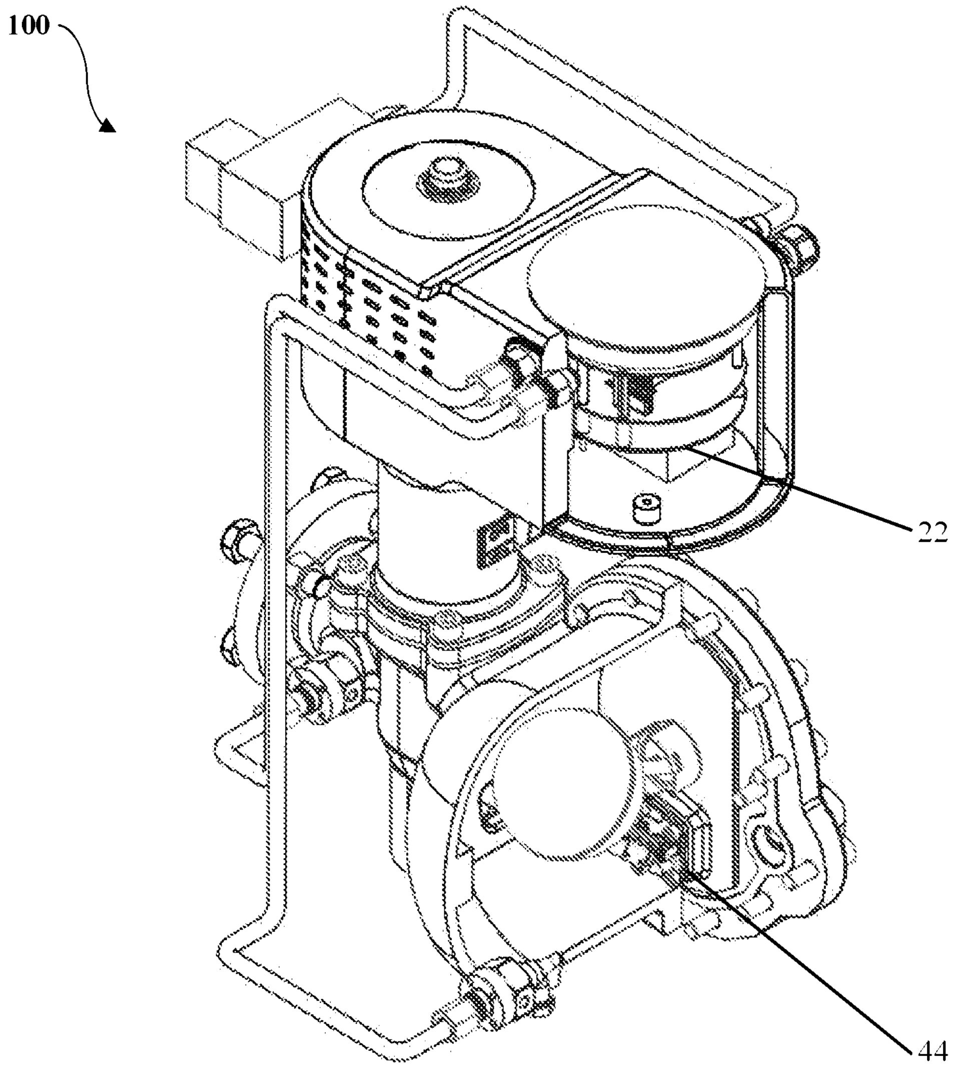

A steam trap system of the present disclosure will now be described with the help of the accompanying drawing, in which:

FIG. 1, FIG. 2, and FIG. 3 illustrate a perspective isometric view of a float type steam trap in accordance with the present disclosure.

LIST OF REFERENCE NUMERALS

100—steam tap system
10—inlet port
12—outlet port
14—diversion valve
16—first sensing unit
18—second sensing unit
20—strainer
22—control unit.
24—Valve actuator
26—first cable gland on controller for first sensing unit
28—second cable gland on controller for solenoid valve
30—third cable gland on controller for power supply
32—forth cable gland on controller for process control panel connection
34—fifth cable gland on controller for second sensor cable
36—sixth cable gland on controller for digital connectivity
38—solenoid valve
40—Steam trap condition indicator
42—steam trap bypass outlet
44—steam trap mechanism
46—steam trap cover

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms “a,” “an,” and “the” may be intended to include the plural forms as well, unless the context clearly suggests otherwise. The terms “comprises,” “comprising,” “including,” and “having,” are open ended transitional phrases and therefore specify the presence of stated features, elements, modules, units and/or components, but do not forbid the presence or addition of one or more other features, elements, components, and/or groups thereof.

When an element is referred to as being “mounted on,” “engaged to,” “connected to,” or “coupled to” another element, it may be directly on, engaged, connected or coupled to the other element. As used herein, the term “and/or” includes any and all combinations of one or more of the associated listed elements.

Terms such as “inner,” “outer,” “beneath,” “below,” “lower,” “above,” “upper,” and the like, may be used in the present disclosure to describe relationships between different elements as depicted from the figures.

Generally, the conventional steam trap system removes condensate irrespective of its quality as they do not have any mechanism to identify and segregate impure condensate or any other fluid apart from the condensate. As a result, the impure condensate from the trap gets discharged into a common condensate recovery system, and contaminates the condensate collected from other traps. Therefore, it becomes necessary to drain the impure condensate before it reaches the recovery system to avoid damages to the condensate recovery system and the condensate utilization system. However, draining the hot impure condensate in large quantities is a huge loss in terms of water collection cost, water treatment cost, and heating cost, thus being not environment-friendly. Also, in case of a failure at closed condition, the conventional steam trap system fails to detect the failure and take any corrective action on such failures.

The present disclosure discloses a steam trap system (100) (herein after referred as system 100). The system is configured to separate condensate fluid from steam. The present embodiment is explained with reference to FIG. 1-FIG. 3. The preferred embodiment does not limit the scope and ambit of the present disclosure.

In a preferred embodiment, the steam trap system (100) is a float type steam trap system (100).

The system comprises an inlet port (10), a diversion valve (14), a bypass outlet (42) an outlet port (12), a trap mechanism (44), at least one first sensing unit (16), at least one second sensing unit (18), a control unit (22), a valve actuator (24), a solenoid valve (38), and a plurality of cable gland.

The inlet port (10) is configured to receive steam flow therein. Therefore, the system is configured to separate condensate from the steam space. The steam space may have condensate fluid with or without dissolved impurities. Therefore, it is required that the condensate fluid with dissolved impurities and the condensate fluid free of impurities must be separated from the steam space. The diversion valve (14) is defined by a three-way valve with one inlet passage and two outlet passages. i.e. a first passage and a second passage. The inlet passage of the diversion valve (14) is configured to be mounted on a downstream of the inlet port (10).

In an embodiment, the diversion valve (14) is configured to function as a default steam trap system (100) bypass to selectively remove the condensate fluid through the first passage or the second passage.

The bypass outlet (42) is in communication with the first passage of the diversion valve (14). The bypass outlet (42) is configured to allow passage for the flow of the condensate fluid with dissolved impurities in an operative configuration of the system. However, the trap mechanism (44) is configured to be in communication with the second passage of the diversion valve (14) and is further configured to allow passage for the flow of the condensate fluid free of impurities in an operative configuration of the system.

Further, the first sensing unit (16) is configured within the inlet port (10). The first sensing unit (16) is configured to sense the steam entering via the inlet port (10) and further configured to generate at least one first sensed value corresponding to the steam flow characteristics.

In a preferred embodiment, the first sensed value corresponding to the steam flow characteristics includes at least a first sensed conductivity value and a first sensed temperature value for the steam entered through the inlet port (10).

Further, the control unit (22) includes a memory unit, a comparator, and a processing unit, configured to be sequentially arranged within the controller unit to generate an actuating signal. The control unit (22) is configured to be in communication with the first sensing unit (16) to receive at least the first sensed conductivity value and the first sensed temperature value. The memory unit is configured to store the steam flow characteristics, specifically at least one threshold conductivity value and at least one threshold temperature value of the condensate fluid of the steam.

In an embodiment, the steam flow characteristics, specifically the threshold conductivity value and the threshold temperature value are manually fed to the steam trap system (100).

In another embodiment, the steam flow characteristics, specifically the threshold conductivity value and the threshold temperature value are automatically retrieved from a cloud server based on the factory codes or steam codes or by temperature-pressure parameters using different engineering plots.

The comparator is configured to be in communication with the memory unit and is further configured to compare at least the threshold conductivity value with the first sensed conductivity value. The processing unit is configured to be in communication with the comparator. Therefore, the processing unit receives the compared result from the comparator to generate the actuating signal for the valve actuator (24).

In an embodiment, the comparator is configured with a set of rules or machine learning algorithm to compare the threshold conductivity value with the first sensed conductivity value.

In an embodiment, the first sensing unit (16) is configured to sense or measure the real-time steam flow characteristics. i.e. the conductivity and the temperature of the condensate fluid of the steam entering through the inlet port (10).

In an embodiment, the first sensing unit (16) is connected to the control unit (22) be means of a first cable gland (26).

Further, the valve actuator (24) is configured to be in communication with the control unit (22) and the diversion valve (14). Thus, the control unit (22) controls the operation of the valve actuator (24) through solenoid valve (38) and the valve actuator (24) in turns controls the operation of the diversion valve (14) in an operative configuration of the system. In an embodiment, the valve actuator (24) is mounted with a solenoid valve (38). The solenoid valve (38) is configured to be in communication with the processing unit by means of a second cable gland (28) and is further configured to receive the actuating signal. The solenoid valve (38) converts the electric actuating signal received from the control unit (22) to a pneumatic signal for the actuation of the valve actuator (24) to activate or deactivate the diversion valve (14).

In an embodiment, the valve actuator (24) is selected from a group of pneumatic actuators and is configured to operate the diversion valve (14) based on the pneumatic signal to activate or deactivate either of the first passage or the second passage of the diversion valve (14) to direct the flow of condensate fluid to pass through either the bypass outlet (42) or the trap mechanism (44). Advantageously, the selective opening or activation of the first passage or the second passage of the diversion valve (14) enables the separation of the condensate fluid without dissolved impurities and condensate fluid free of dissolved impurities from the steam space, in an operative configuration of the system.

In a first embodiment, the valve actuator (24) is configured to activate the first passage. i.e. the bypass outlet (42) of the diversion valve (14) if the first sensed conductivity value is greater than the threshold conductivity value to enable the condensate fluid having dissolved impurities to drain out.

In a second embodiment, the valve actuator (24) is configured to activate the second passage .i.e. the trap mechanism (44) of the diversion valve (14) if the first sensed conductivity value is less than the threshold conductivity value to enable the condensate fluid free of impurities to drain out from a trap outlet.

Further, the system includes at least one second sensing unit (18). The second sensing unit (18) is configured to be mounted within the vicinity of the trap mechanism (44) and is further configured to generate a second sensed conductivity value and a second sensed temperature value of the steam approaching the trap mechanism (44).

In an embodiment, the second sensing unit (18) is configured to measure the real-time steam flow characteristics of the condensate fluid exiting through the outlet port (12).

In an embodiment, the first sensing unit (16) and the second sensing unit (18) are selected from a group of thermocouples, conductivity sensor, temperature sensor, pH sensor, turbidity sensor or oil in water sensor or any combination thereof.

Further, the second sensing unit (18) is configured to be in communication with the control unit (22). Therefore, in response to the second sensed conductivity value and the second sensed temperature value generated by the second sensing unit (18), the control unit (22) is configured to identify and indicate open steam-leak, close-water logged condition from the system.

In an embodiment, the second sensing unit (18) is configured to be in connection with the control unit (22) be means of a fifth cable gland (34).

In an embodiment, the control unit (22) is configured to mount either a remote monitoring wireless device or a remote monitoring wired device to monitor real-time performance and to allow setting of threshold values of the steam trap system (100).

In an embodiment, the steam trap system (100) can be configured to send process duration data based on the change in first and second sensing unit values through wired or wireless digital connectivity technologies to compare with set process parameters, helping in improving process efficiency.

In an embodiment, the steam trap system (100) can be configured to utilize first sensed conductivity and temperature values to detect and indicate process leakage, while diverting contaminated condensate through bypass (42). In case of heat-exchanger leakage, the first sensed conductivity value and first sensed temperature value will be higher than the conductivity threshold value and temperature threshold value for more than a set duration.

In an embodiment, the steam trap system (100) is capable is diagnosing failures of sensing units (16 and 18), diversion valve (14), valve actuator (24), and solenoid valve (38) based on first sensed conductivity value and temperature value and second sensed conductivity value and temperature value generated by the respective sensing units In an embodiment, the steam trap system (100) is connected to a remote monitoring device wirelessly. In another embodiment, the steam trap system (100) is connected by a wire to a monitoring device. The remote monitoring device enables a user to monitor the performance of the steam trap system (100) and to take maintenance action in case of any failure.

Advantageously, the steam trap system (100) is configured to share data regarding its various working and failure conditions through wired or wireless digital connectivity technology to remote devices to monitor trap conditions remotely and immediately initiate corrective action in case if any failure.

In an embodiment, the digital output is connected to the control unit (22) by means of sixth cable gland (36).

In an embodiment, the steam trap system (100) uses MODBUS and BLUETOOTH or other wired and wireless digital connectivity technologies respectively to communicate with other devices to share data.

The detected parameters and conditions/status and sent to the controller 8 can be shared through wired and wireless communication protocols to other devices for further analysis.

In an embodiment, the control unit (22) includes a plurality of light indicators (40). The light indicator (40) is configured to indicate the operation thereof, specifically when the trap is in bypass mode or in trap mechanism (44) mode, and indicate trap conditions.

In an embodiment, the system includes a power device. The power device is configured to be in connection with the controller, the first sensing unit (16), the second sensing unit (18), the valve actuator (24), the diversion valve (14) and the solenoid.

In an embodiment, the control unit (22) includes power device is connected to the controller by means of a third cable gland (30).

In an embodiment, process control signal cable is connected to the control unit (22) by means of a fourth cable gland (32).

In an embodiment, the first sensing unit (16) and the second sensing unit (18) are located in close proximity of the fluid passing through the steam trap system (100).

In an exemplary embodiment, if the steam flowing through the inlet of the trap system has condensate fluid with dissolved impurities, then the conductivity of the condensate fluid increases. Therefore, the first sensing unit (16) senses the entering steam and generates the first conductivity value and the first temperature value. Based on the sensed first conductivity value relatively higher than the threshold conductivity value, the control unit (22) actuates the valve actuator (24) by means of the solenoid valve (38). The valve actuator (24) is turns activates the first passage. i.e. the bypass outlet (42) to direct the flow of the condensate fluid, where it is drained or recovered separately. On the other hand, if the steam flowing through the inlet of the trap system has condensate fluid with free of impurities, it is directed to the trap mechanism (44) through which it is recovered at the trap outlet port (12).

In an embodiment, the steam trap system (100) includes an inlet sensor and a trap monitoring sensor.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a steam trap system, that:

- is configured to efficiently remove condensate from a steam space;
- detect and divert condensate with dissolved impurities or other fluids other than condensate to ensure recovery of relatively pure condensate therethrough;
- can be remotely monitored and controlled;
- facilitate setting of thresholds remotely through any wired or wireless device using digital connectivity technology;

communicate and share data with other devices through wired and wireless communication protocols capable of communicating and sharing data to cloud;

removes condensate fluid through a bypass even when there is a failure of steam trap in closed condition to prevent waterlogging in steam space of process equipment;

work in flammable and non-flammable industrial environment;

detect the quality of condensate and divert the impure condensate or fluid other than condensate through bypass valve;

takes corrective action when the trap is failed in closed condition;

monitors failure mode and working mode;

indicates heat exchanger leakage with the detection of contaminated condensate.

helps in monitoring of heating cycle duration and helps in improving the process efficiency detects and indicates failure of first and second sensing unit, diversion valve, valve actuator, and solenoid valve in the system.

helps in saving water cost, water treatment cost, and heating cost;

indicates various working and failure conditions thereof;

is environment friendly; and.

communicate digitally various working and failure conditions in wireless or wired form.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A steam trap system (100) configured to separate condensate fluid from steam space, said system comprising:

an inlet port (10) configured to receive steam flow therein, the steam has condensate fluid with or without dissolved impurities;

a diversion valve (14) configured to be mounted on a downstream of said inlet port (10) and further configured to be branched to at least a first passage and a second passage;

a bypass outlet port (12) configured to be in communication with said first passage of said diversion valve (14) and further configured to allow passage for the condensate fluid having dissolved impurities in an operative configuration of said system;

a trap mechanism (44) configured to be in communication with said second passage of said diversion valve (14) and further configured to allow passage for the condensate fluid free of impurities in an operative configuration of said system;

at least one first sensing unit (16) configured within said inlet port (10), said first sensing unit (16) configured to sense the steam entering via said inlet port (10) and further configured to generate a first sensed conductivity value and a first sensed temperature value of the steam entering through said inlet port (10);

a control unit (22) comprising a memory unit configured to store a threshold conductivity value and a threshold temperature value of the condensate fluid, a comparator configured to compare said threshold conductivity value with said first sensed conductivity value, and a processing unit configured to generate an actuating signal based on said comparison;

a solenoid valve (38) configured to receive said actuating signal from said control unit (22) and further configured to convert said actuating signal to a pneumatic signal; and a valve actuator (24) configured to be in communication with said control unit (22) by means of said solenoid valve and said diversion valve (14), said valve actuator (24) configured to receive said pneumatic signal and further configured to selectively activate either said bypass outlet port (12) or said trap mechanism (44) of said diversion valve (14) to allow separation of the condensate fluid with or without dissolved impurities from the steam, in an operative configuration of said system.

2. The system (100) as claimed in claim 1, wherein said valve actuator (24) is selected from a group of pneumatic actuators and is configured to operate said diversion valve (14) based on said pneumatic signal to direct the flow of condensate fluid to pass through either said bypass outlet (42) or said trap mechanism (44).

3. The system (100) as claimed in claim 2, wherein said valve actuator (24) is configured to activate said bypass outlet (42) of said diversion valve (14) if said first sensed conductivity value is greater than said threshold conductivity value to enable the condensate fluid having dissolved impurities to drain out.

4. The system (100) as claimed in claim 2, wherein said valve actuator (24) is configured to activate said trap mechanism (44) of said diversion valve (14) if said first sensed conductivity value is less than said threshold conductivity value to enable the condensate fluid free of impurities to discharge from a trap outlet.

5. The system (100) as claimed in claim 1, includes at least one second sensing unit (18), configured to be mounted within the vicinity of said trap mechanism (44) and is further configured to generate a second sensed conductivity value and a second sensed temperature value of the steam exiting through said trap mechanism (44).

6. The system (100) as claimed in claim 5, wherein said first sensing unit (16) and said second sensing unit (18) are configured to measure the real-time steam flow characteristics of the condensate fluid entering through said inlet port (10) and exiting through said trap mechanism (44), respectively.

7. The system (100) as claimed in claim 5, wherein said control unit (22) is configured to be in communication with said second sensing unit (18) and is further configured to indicate open steam-leak, close-water logged condition from said system based on said second sensed conductivity value and said second sensed temperature value of the steam approaching trap mechanism (44).

8. The system (100) as claimed in claim 7, wherein said control unit (22) is configured to connect with either a remote monitoring wireless device or a monitoring wired device to monitor real-time performance and to allow setting of threshold values of said steam trap system (100).

9. The system (100) as claimed in claim 8, wherein the steam flow characteristics includes pH, oil content, turbidity of the condensate fluid of the steam.

10. The system (100) as claimed in claim 8, wherein said control unit (22) is configured to detect and indicate heat-exchanger leakage and monitor heating cycle duration data, which in turn improves the process efficiency.

11. The system (100) as claimed in claim 8, wherein said control unit (22) is configured to detect and indicate failure of said first and second sensing unit (16, 18), diversion valve (14), valve actuator (24), and solenoid valve (38) in said system (100).

* * * * *